United States Patent Office 3,019,155
Patented Jan. 30, 1962

3,019,155
DECORATIVE LAMINATES
Francis H. Snyder, Newtown, Conn., assignor to Francis H. Snyder and Associates, Incorporated, New Milford, Conn., a corporation of Connecticut
No Drawing. Filed Dec. 21, 1956, Ser. No. 629,791
10 Claims. (Cl. 162—149)

Decorative laminates of the kind widely used for table tops and similar work surfaces are, as the name implies, formed by laminating sheet materials. Usually, especially where the exposed surface is light in color, this surface is formed of a light colored paper material impregnated with an aminoplast such as a melamine-formaldehyde or a urea-formaldehyde resin. The underlying layers are made of kraft stock impregnated with phenolic resins. The entire laminated structure is hot cured in hydraulic presses at pressures and for times suitable to the resins employed. Since the time necessary for curing increases rapidly with increase of thickness, commercial decorative laminates are usually approximately one-sixteenth inch thick.

In order to enhance the capacity to absorb phenolic resin, the kraft sheets employed for the interior of the laminate must be formed from paper fiber that has been subjected to a minimum amount of beating in the paper-making process. This leads to the paper having what is commonly called a "wild formation," characterized by the presence of numerous clumps of insufficiently separated fibers which, in turn, cause unevenness of the sheet. When a large number of these sheets are assembled to form the laminate, these variations in thickness of the constituent layers are accentuated, giving the surface of the laminate a peen-hammered appearance. This condition cannot be adequately corrected since the deformation of the surface is irreversible. Delamination often results from precure of the resin in the dryer or to inadequate resin at the paper surface.

My invention aims to obviate a number of these disadvantages. Instead of using a plurality of sheets, I prefer to use a single sheet of felted fibers for the entire interior portion or core of the board. Modern paper machines are capable of producing sheets to the full thickness necessary to obtain any of the conventional thicknesses of pressed sheets, and likewise, they may be controlled to deliver the precise thickness desired. Obviously, the sheet delivered from the paper machine will be relatively thicker than the finished article, to accommodate the compression during the curing process. Suitable regulation of the paper machine will result, as stated, in the delivery of an uncompressed sheet which, upon compression, will be within the allowable limit of variation from the desired dimensions. As will be apparent from consideration of my method of applying resin, it is well suited to use with multiple laminae, if desired.

In order to eliminate variations of thickness within the sheet, I find it desirable to employ fibers of various lengths, thereby tending to produce an interlocking of the fibers in a manner analogous to the use of a wide selection of sizes of aggregate in concrete. A substantial proportion of the fibers, from fifty percent downwards are of kraft, such as are ordinarily used for laminates but in my process they are to be sufficiently refined so that clumps of fiber bundles are substantially eliminated. Very satisfactory results are obtained by the use of twenty percent kraft fiber and even lower amounts may be used without serious harm to the quality of the finished sheet. The remaining fiber will be shorter and of well distributed length so that the average fiber length including the kraft fiber, is about one-fourth to no more than half that of the kraft fiber only. Since the average fiber length of long fiber kraft paper is 3 to 5 mm. my product will contain a great deal of fiber shorter than 1 mm. ranging on up to 5 or 6 mm. and averaging 1 to 2 mm.

The foregoing steps, as well as certain of those that follow, may be briefly outlined as follows:

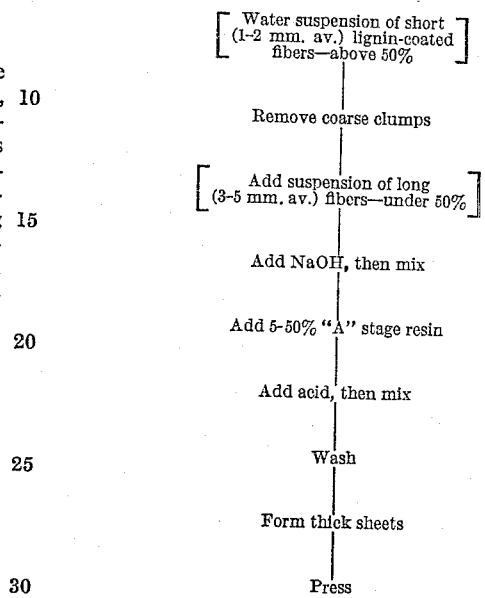

In spite of the lower average fiber length the flexural strength of the panels is about equal to all kraft panels. The modulus of elasticity is lower which means that the ability of my new laminate to bend without breaking is greatly improved.

Instead of applying the resin, in the form of a solution to an already formed sheet, as is ordinarily practiced, I prefer to apply the resin to the individual paper fibers in suspension in water. It is obviously desirable to have each individual fiber coated with resin.

The application of the resin coating to the individual fibers may take place in several ways or a combination thereof. A-stage, alkali-catalyzed phenolic resins may be added to aqueous suspensions of fiber and, when this is done, an adequate quantity of resin is taken up with entirely satisfactory uniformity by the fibers. The resin deposited on the fiber does not cause adhesion of the fibers to each other at ordinary room temperatures so that it is possible to obtain thorough intermixture of the fibers making up the desired fiber mixture being fed to the paper machine. Flow of the resin is delayed until the pressing operation takes place.

As disclosed in my publication entitled "New Potentials in Fibers and Chemicals from Wood Waste," published in Forest Product Journal for October 1955, when wood chips are treated with steam in the temperate range of 225 to 285° C. for approximately one minute under electrolyte-catalytic conditions adjusted to obtain a final pH of approximately 4.6, free fibers are obtained associated with a lignin derivative deposited on the fiber in the form of minute beads or as a smooth glassy coating.

The fiber of this process, carrying as it does a substantial amount of resinous material, affords an excellent starting base for the interior portion of my laminate. If the fiber length distribution is not satisfactory, it may be suitably adjusted by fractionation and recombining. That is, the fibers may be passed through screens while suspended in water, so as to segregate the fibers according to length. Excessive quantities of fibers in any particular size range may be removed and, if there is a deficiency of any size range, more fiber of the desired length may be added. Also, shorter fiber may be manufactured by attrition of longer fiber. The amount of depolymerized lignin attached to the fibers may be reduced, if necessary, by mechanical working of the fiber and screening off a portion of the so-removed lignin.

The lignin derivative, although of a phenolic nature, is not, by itself, ideal for laminate purposes. The addition of a five to fifty percent alkaline-catalyzed phenolic resin, based upon the lignin content of the fiber will produce satisfactory laminates at substantial reduction in the amount of phenolic resin required if no lignin derivative were present. Phenolic resins relatively high in methylol content are preferred. The phenolic resin, in a partially advanced stage, may be added to the fibers in aqueous suspension as described previously.

It is preferred to add the kraft fibers to an aqueous suspension of the lignin bearing fibers derived as above disclosed. The admixed fibers can then be given a little mechanical working in a disc-refiner, beater or high-speed mixer to insure even distribution of the respective fibers. The phenolic resin is then added. Thus, at least a portion of the phenolic resin coats the kraft fibers in the mixture so that, in the finished laminate, resin will have penetrated about every single fiber.

Desirably, before the phenolic resin is added to the fiber mixture, a small amount of NaOH, say, three to five percent of the lignin derivative may be added to the aqueous suspension to peptize the lignin. An excessive amount of NaOH will take the lignin into solution. The phenolic resin is then added and worked into the fibers, followed by an adjustment of the pH to about 5.0 to 5.5 with acid. If the stock is then washed on a suction filter before being formed on a paper machine, a product superior in water-resistance and toughness is obtained.

There is a distinct advantage to the use of this system for introducing resin into the laminate when it is built up of a plurality of sheets, as has been heretofore conventional. The diffuse distribution of resin, fiber by fiber facilities intimate penetration of the resin across the sheet boundaries, effectively uniting the sheets into a single mass. Also, the heat in pressing progresses evenly melting the resin in small increments, rather than at large intervals as is the case with conventional impregnation.

Cured laminate sheets, made in the manner aforesaid, have many superior qualities compared to those now being commercially produced. They can be made very accurately to the desired thickness which obviates sanding as a means of thickness control. They are of substantially uniform thickness across the sheet, being free of high and low spots such as are found in ordinary laminates. They are not susceptible of splitting since the fibers contained in the inner layer are distributed in three dimensions within the layer. They are susceptible to up to 2.5 times the bending radii sustained by conventional laminate boards, before failure. They have much better water resistance, resistance to alkalies and detergents, and better dimensional stability than conventional panels. They have improved resistance to cigarette burns, and heat-blistering generally. In spite of these superior qualities, their manufacture is substantially more economical. The fiber content is, for the majority thereof, more economical. Further economy is effected by the dilution of the phenolic resin with less expensive lignin derivative. Finally, the addition of the resin to the fiber is distinctly more economical an operation than the conventional method.

I claim:

1. The process of making a felted fiber panel, bonded by thermosetting resin, which comprises obtaining fiber in a range of fiber lengths wherein the average length is 1 to 2 mm. and at least twenty percent of the fibers are of 3 to 5 mm. average length and wherein the uncured resin is distributed thinly upon individual fiber, substantially all of the resin required being distributed on substantially less than all of the fibers, forming the fibers into a felted sheet and pressing the sheet at an elevated temperature to cause the resin to flow throughout the felted mass to bond the same into a unitary panel.

2. The process of claim 1 wherein the sheet is laminated to a resin impregnated face before pressing.

3. The process of claim 1 wherein substantially all of the fibers are cellulosic.

4. The process of claim 3 wherein only the shorter portion of the fibers is coated with resin, and the coated fibers and the non-coated fibers are each separately suspended in water prior to and in order to facilitate intermixing.

5. The process of claim 4 wherein about twenty percent of the fibers are non-coated kraft.

6. The process of claim 3 wherein at least a portion of the resin coating is applied to the fibers while they are in aqueous suspension.

7. The process of claim 6 wherein the coating applied from suspension is a phenolic resin.

8. The process of making a resin-bonded felted fiber panel which comprises obtaining an aqueous suspension of relatively short wood fibers intimately associated with lignin derivative, adding thereto about twenty percent longer cellulose fibers in aqueous suspension, subjecting the mixture to light mechanical working to obtain thorough mixing, adding liquid, A-stage phenolic resin in lesser amount than the lignin resin contained on the wood fibers, forming the fibers into a felted sheet and pressing the sheet at an elevated curing temperature to cause the resin to flow throughout the felted mass to bond the same into a unitary panel.

9. The process of claim 8 wherein a small amount of alkali, sufficient to peptize the lignin without appreciably dissolving it, is added to the aqueous fiber suspension prior to the addition of the phenolic resin and, after the phenolic resin is added, the pH is adjusted to 5.0 to 5.5.

10. The process of claim 9 wherein the fibers are washed just prior to their formation into felted form.

References Cited in the file of this patent

UNITED STATES PATENTS

| | | |
|---|---|---|
| 1,663,505 | Mason | Mar. 20, 1928 |
| 1,901,382 | Stevenson | Mar. 14, 1933 |
| 1,922,313 | Mason | Aug. 15, 1933 |
| 2,198,232 | Shopneck | Apr. 23, 1940 |
| 2,224,135 | Boehm | Dec. 10, 1940 |
| 2,516,847 | Boehm | Aug. 1, 1950 |
| 2,525,310 | Novak | Oct. 10, 1950 |
| 2,526,125 | Francis | Oct. 17, 1950 |
| 2,631,097 | Redfern | Mar. 10, 1953 |
| 2,643,186 | Tower | June 23, 1953 |
| 2,653,870 | Kast | Sept. 29, 1953 |
| 2,804,418 | King | Aug. 27, 1957 |
| 2,805,946 | Boehm et al. | Sept. 10, 1957 |
| 2,930,106 | Wrotnowski | Mar. 29, 1960 |

FOREIGN PATENTS

| | | |
|---|---|---|
| 461,272 | Great Britain | Feb. 15, 1937 |
| 600,602 | Great Britain | Apr. 14, 1948 |
| 700,882 | Great Britain | Dec. 9, 1953 |

OTHER REFERENCES

Dickerman: "Paper Trade Journal," vol. 118, No. 26, June 29, 1944, Tappi section, pages 239–242.

Clark: "Paper Trade Journal," Dec. 24, 1942, Tappi section, pages 328–333.

Doughty: Technical Association Papers, Series XV, February 1932, pages 137–142.